United States Patent [19]
DeRegnaucourt et al.

[11] 3,811,733
[45] May 21, 1974

[54] RETAINED FASTENING ELEMENTS FOR A RIM AND WHEEL ASSEMBLY

[75] Inventors: Robert A. DeRegnaucourt, Centerville; Fred R. Caudill, Dayton, both of Ohio

[73] Assignee: The Dayton Steel Foundry Company, Dayton, Ohio

[22] Filed: June 26, 1972

[21] Appl. No.: 266,212

[52] U.S. Cl................. 301/12 R, 151/69, 301/11 R
[51] Int. Cl............................................ B60b 23/00
[58] Field of Search........ 151/69; 301/13 R, 13 SM, 301/12

[56] References Cited
UNITED STATES PATENTS

| | | | |
|---|---|---|---|
| 2,761,484 | 9/1956 | Sternick............................. | 151/69 |
| 3,638,980 | 2/1972 | Kleinhenn.......................... | 151/69 |
| 2,352,487 | 6/1944 | McNamara........................ | 151/69 |
| 2,884,280 | 4/1959 | Atkin................................ | 301/13 SM |

FOREIGN PATENTS OR APPLICATIONS
159,573    1/1954    Australia........................ 301/13 R

OTHER PUBLICATIONS

Machine Design; 1971 Fastening and Joining Reference Issue; Nov. 18, 1971; "Retaining Rings."

Primary Examiner—Robert S. Ward, Jr.
Assistant Examiner—Reinhard J. Eisenzoph
Attorney, Agent, or Firm—Mack D. Cook, II

[57] ABSTRACT

A rim and wheel assembly including a series of axially inner clamp means and a series of axially outer clamp lugs to co-operatively engage the mounting flange of a rim. The clamp means are supported by fastening elements extending axially through the wheel. The fastening elements carry fastening means which draw clamp means toward the clamp lugs to seat the rim flange. Means are provided so that the fastening elements are retained on the wheel when a rim is being demounted and mounted.

9 Claims, 9 Drawing Figures

3,811,733

RETAINED FASTENING ELEMENTS FOR A RIM AND WHEEL ASSEMBLY

CROSS-REFERENCE TO RELATED APPLICATIONS

The use as clamping elements of sets of axially inner clamp means and axially outer clamp lugs supported by fastening means extending axially through bores in the wheel and carrying fastening means thereon, is the subject matter of co-pending application Ser. No. 252,411, filed May 11, 1972.

BACKGROUND OF THE INVENTION

The invention relates to a rim and wheel assembly. More particularly, the invention relates to an improvement for the rim and wheel assembly of co-pending application Ser. No. 252,411, filed May 11, 1972, whereby a tire carrying rim is mounted on a wheel, such as the front wheel, of a motor vehicle, such as a truck.

The rim and wheel assembly of co-pending application Ser. No. 252,411, filed May 11, 1972, includes a series of axially inner clamp means and a series of axially outer clamp lugs to cooperatively engage the mounting flange of a rim. The clamp means and clamp lugs each have intersecting surfaces for engaging seating and positioning surfaces on the rim. Each set of a clamp means and a clamp lug is supported by a fastening element extending through a bore in the wheel. The fastening elements carry fastening means which draw the clamp means toward the clamp lugs to seat the rim flange for mounting a tire carrying rim.

When demounting a tire carrying rim, it has been found that loosening or removal of the fastening means by the mechanic will sometimes result in the fastening elements being displaced, mutilated, deformed or even lost.

The improvements provided by the present invention are intended to retain the fastening means within the wheel bores when the fastening means are loosened or removed, for demounting a tire carrying rim, so that another tire carrying rim may be correctly and properly mounted.

SUMMARY OF THE INVENTION

The object of the invention is to provide an improved rim and wheel assembly.

It is a further object of the invention to provide an improved rim and wheel assembly, where the clamping elements are sets of axially inner clamp means and axially outer clamp lugs supported by fastening elements extending axially through bores in the wheel and carrying fastening means thereon, with means so that the fastening elements are retained in the wheel bores when a tire carrying rim is demounted and remain in proper position for mounting another tire carrying rim.

These and other objects of the invention, and the advantages thereof, will be apparent in view of the Description of various Embodiments as set forth below.

In general, a rim and wheel assembly according to the invention has clamping elements including a series of axially inner clamp means and a series of axially outer clamp lugs supported by fastening elements extending axially through bores in the wheel, and carrying fastening means thereon. Means are provided so that the fastening elements are retained in the bores when the fastening means are temporarily loosened or removed for demounting a tire carrying rim.

As disclosed herein, a retaining means for a fastening element according to the invention may have several forms. The retaining means may be a protruding element received in a counterbore or enlarged diameter portion. The counter-bore may be in the wheel bore, on the wheel boss surface or in the fastening means. The protruding element may be a serrated collar formed integrally on the shank of the fastening element or a rubber collar bonded to the shank, bonded within the counter-bore or inserted in the counter-bore. The retaining means may also be a ring or spring clip carried on the shank of the fastening element and received in a shallow recess or well on the boss surface of a wheel.

DETAILED DESCRIPTION OF THE INVENTION

Figure 1:
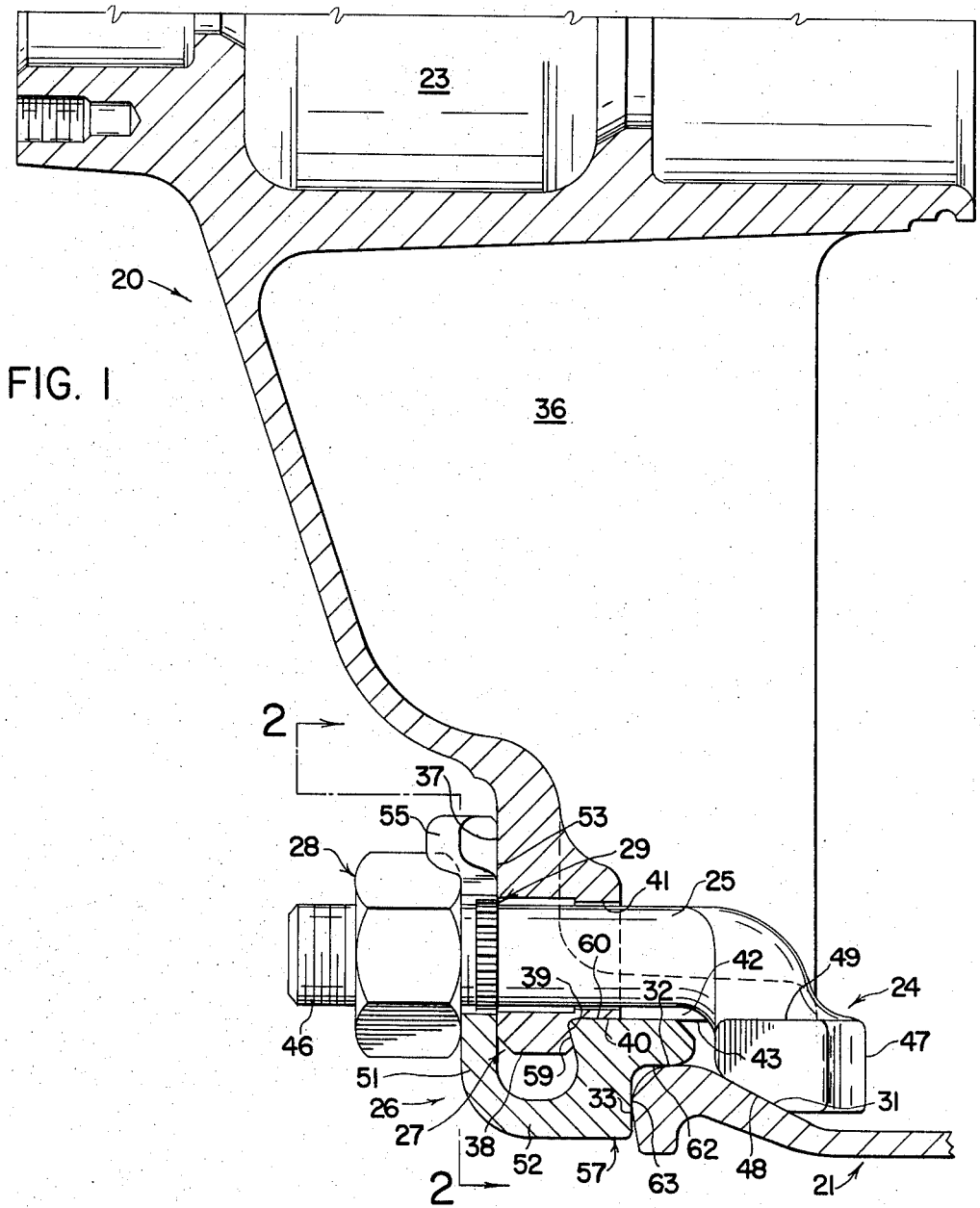
FIG. 1 is a fragmentary sectional view of a rim and wheel assembly which is the subject matter of co-pending application Ser. No. 252,411, filed May 11, 1972, with a fastening element retained according to the invention by a serrated collar received in a wheel counter-bore.
Figure 2:
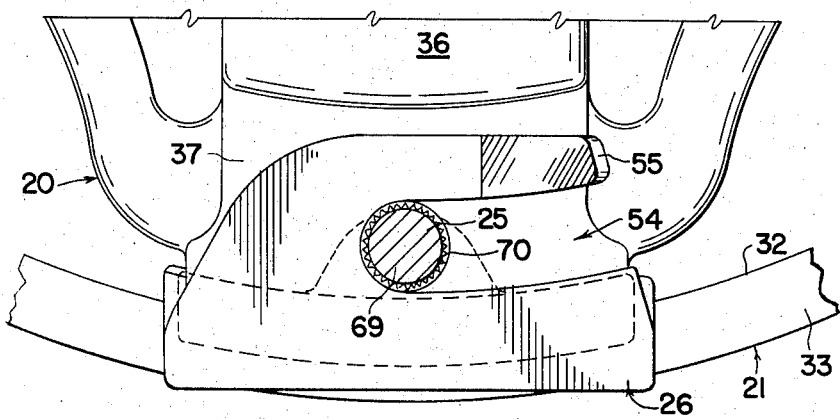
FIG. 2 is an axially outer plan view of a rim and wheel assembly, taken substantially as indicated on line 2—2, of FIG. 1.

Referring to FIGS. 1 and 2, a rim and wheel assembly using the fastening element retaining means according to the invention, is referred to generally by the numeral 20. The single rim is referred to generally by the numeral 21. The wheel is referred to generally by the numeral 23. The series of axially inner clamp means are referred to generally by the numeral 24. The fastening elements are referred to generally by the numeral 25. The series of axially outer clamp lugs are referred to generally by the numeral 26. A positive retention means for the clamp lugs is referred to generally by the numeral 27. The fastening means for the fastening elements 25 are referred to generally by the numeral 28. The retaining means for the fastening elements 25 are referred to generally by the numeral 29.

The rim 21 may be a conventional flat base rim having a fixed bead flange and a removable bead flange (not shown). As shown, the mounting flange of the rim 21 has an axially inner holding surface 31, preferably inclined at an angle of 28° from the rotational axis of the rim. The holding surface 31 intersects and merges into a radially inner seating surface 32, preferably axially oriented substantially horizontal or parallel to the rotational axis of the rim. The seating surface 32 intersects and merges into an axially outer gutter or positioning surface 33, preferably radially oriented substantially vertical or perpendicular to the rotational axis of the rim. The rim mounting surfaces 31, 32 and 33 depict a conventional form of a mounting flange of a rim which may be assembled as part of an assembly 20. The angularity of these surfaces could be varied somewhat in relation to the rotational axis of the rim.

The wheel 23 may be either a cast spoked wheel or a disc wheel, formed by stamping or forging. As shown, the wheel 23 is a spoked wheel having a conventional hub area 35. Any desired number of spokes 36, preferably five or six, extend radially of the hub area 35.

The peripheral portion of each spoke 36 has a boss surface 37 for seating the radially oriented leg of a clamp lug 26, as described in further detail below.

The positive retention means 27 for the clamp lugs 26 on the peripheral portion of a wheel are formed by the boss surface 37 radially oriented substantially vertically or perpendicular to the rotational axis of the wheel, an intersecting surface 38 axially oriented substantially horizontal or parallel to the rotational axis of the wheel, an intersecting surface 39 inclined radially inwardly and axially outwardly in relation to the rotational axis of the wheel, and an intersecting concave surface 40 axially oriented substantially horizontal or parallel to the rotational axis of the wheel. The clamp lug retention surfaces 37, 38, 39 and 40 define one form of a positive retention means 27. The angularity of these surfaces could be varied somewhat in relation to the rotational axis of the wheel.

An axially oriented bore 41, for loosely receiving the shank of the fastening elements in the form of support bolts 25 for the clamp means 24, extends through the peripheral portion of a wheel 23 radially inwardly of the surface 40. The outer end of a bore 41 opens onto a boss surface 37. As shown, the inner end of a bore 41 opens into an open area 42, provided by a means for positioning a clamp means 24 while engaging a rim flange surface 31.

The clamp means 24 are a series of individual elements positioned by sliding contact with sets of parallel surfaces 43 axially oriented substantially horizontal or parallel to the rotational axis of the wheel, on the radially outer side of the wheel peripheral portions defining the open or slotted area 42 and on opposite sides of a support bolt 25.

The bolt portion 25 supporting the clamp means 24 is threaded as at 46 for engagement with a fastening means 28 in the form of a nut. The bolt portion 25 extends through a wheel bore 41 to join with the wedge portion 47. The radially outer face of a wedge portion 47 has a conical surface 48 for matingly engaging a correspondingly inclined rim flange mounting surface 31. The radially inner face of a wedge portion 47, on opposite sides of the juncture point with the bolt portion 25, has axially oriented surfaces 49 for slidingly engaging the surfaces 43 on the wheel when the fastening means 28 are tightened.

A clamp lug 26 is provided for each support bolt 25. A clamp lug 26 has a radially directed leg 51 and an axially directed leg 52.

A clamp lug radial leg 51 has an axially inner surface 53 to slidably engage a boss surface 37 on the wheel 23. A leg 51 also has an arcuate slot 54 formed on the radius concentric with the wheel bores 41. A slot 54 preferably opens to the right of the axially outer face of a clamp lug 26 and is manually moved counterclockwise to engagement with a positive retention means 27 on the peripheral portion of a wheel 23. The tip portion of the radial leg 51, radially inwardly of the slot 54, is preferably bent axially outwardly as at 55 to facilitate "starting" of a clamp lug around a bolt 25 and onto the retention means 26.

A clamp lug axial leg 52 has a seat portion 57. The seat portion 57 projects radially inwardly and preferably has four "working" surfaces thereon. A seat portion 57 has an inclined surface 59 for sliding and mating engagement with a wheel surface 39, a convex surface 60 for sliding and seating engagement on a wheel surface 40, an axially oriented surface 62 for seating the rim flange surface 32, and a radially oriented surface 63 for positioning the rim flange surface 33.

Figure 3:
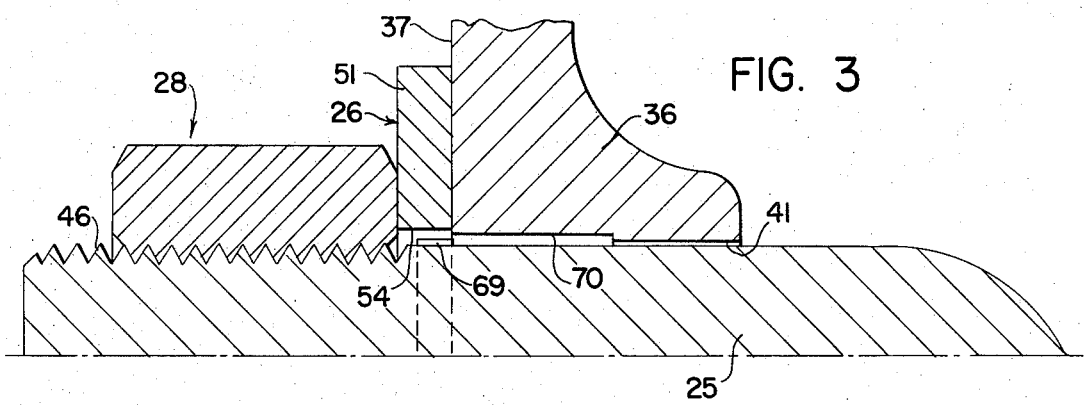
FIG. 3 is one of a series of fragmentary sectional views illustrating various retaining means, specifically illustrating a serrated collar for retaining the fastening element.

Referring to FIGS. 1–3, the retaining means 29 may be a serrated metal collar 69 formed integrally on the shank of the fastening elements 25 adjacent the threads 46. The protruding collar 69 is movably received in a counter-bore or enlarged diameter area 70 of the wheel bore 41. The bolt 25 is installed by insertion of the threaded portion 46 into the axially inner end of the wheel bore 41. Thereafter, the collar 69 is forced through the wheel bore 41 into the counter-bore 70. When the support bolt is in the rim mounting condition, as shown, the collar 69 will be generally positioned within the clamp lug slot 54. When the fastening means or nut 28 is loosened or removed, the collar 69 will be received in the counter-bore 70. The support bolt 25 will be free for limited axial movement, but will be retained by the protruding collar 69.

Figure 4:
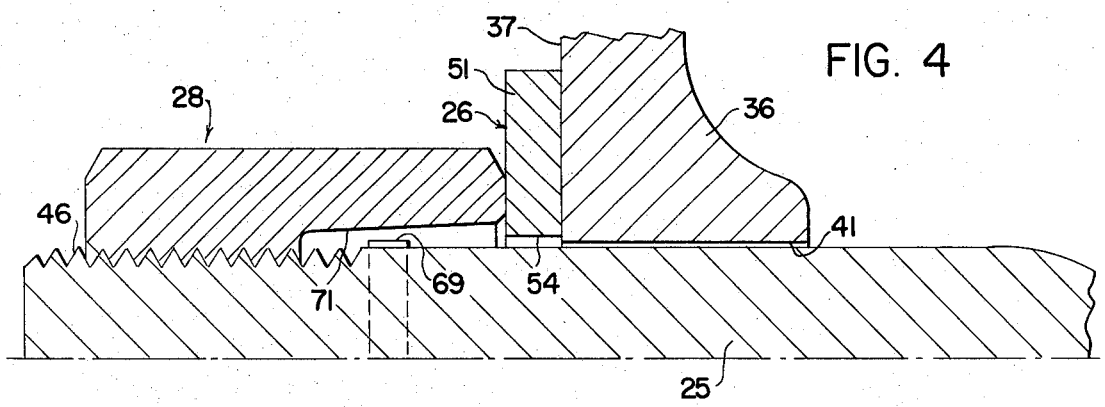
FIG. 4 is a similar view, illustrating a serrated collar received within a counter-bore in a fastening means.

Referring to FIG. 4, the retaining means 29 may be a serrated metal collar 69 formed integrally on an extended shank of the fastening elements 25 adjacent the threads 46. The protruding collar 69 is movably received in a counter-bore or enlarged diameter area 71 in the fastening means 28. The bolt 25 is installed by insertion of the threaded portion 46 into the axially inner end of the wheel bore 41. Thereafter, the collar 69 is forced through the wheel bore 41 and beyond the wheel boss surface 37. When the support bolt 25 is in the rim mounting condition, as shown, the collar 69 will be received within the counter-bore 71. When the fastening means is merely loosened, the collar 69 will remain in the counter-bore 71. If the nut 28 is removed, the support bolt 25 will be free for limited movement, but will be retained by the protruding collar 69.

Figure 5:
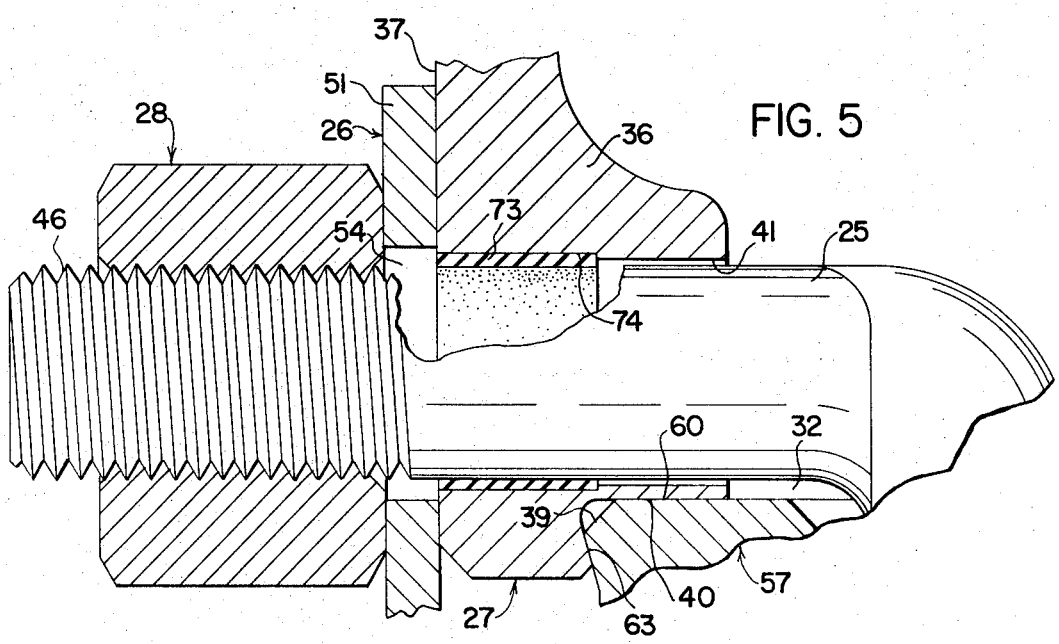
FIG. 5 is a similar view, illustrating a rubber collar bonded to or inserted in the wheel counter-bore.

Referring to FIG. 5, the retaining means 29 may be an annular collar 73, of rubber or similar elastomeric material, bonded to or inserted in a counter-bore or enlarged diameter area 74 of the wheel bore 41. The rubber collar 73 has an expanded inner diameter slightly less than the diameter of the shank of the fastening elements 25. The bolt 25 is installed by insertion of the threaded portion 46 into the axially inner end of the wheel bore 41. Thereafter, the bolt 25 is pushed through the wheel bore 41 and into and through the collar 73 until the thread 46 is beyond the wheel boss surface 37. When the support bolt 25 is in the rim mounting condition, as shown, the shank will be frictionally engaged by the compressed collar 73. When the fastening means or nut 28 is loosened or removed, the support bolt 25 will be free for limited axial movement, but will be retained by the engaging collar 73.

Figure 6:
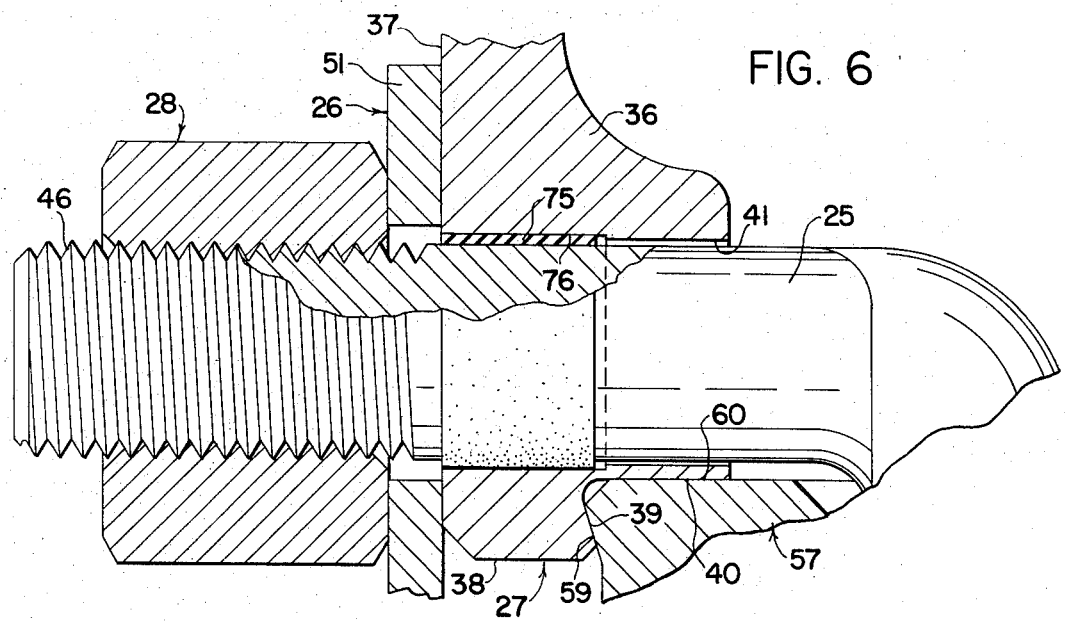
FIG. 6 is a similar view, illustrating a rubber collar bonded to the shank of the fastening element.

Referring to FIG. 6, the retaining means 29 may be an annular collar 75, of rubber or similar elastomeric material, bonded on the shank of the fastening elements 25 adjacent the thread 46. The protruding collar 75 is movably received in a counterbore or enlarged diameter area 76 of the wheel bore 41. The bolt 25 is installed by insertion of the threaded portion into the axially inner end of the bore 41. Thereafter, the collar 75 is forced through the wheel bore 41 into the counterbore 76. When the support bolt 25 is in the rim mounting condition, as shown, the surface of the counterbore 76 will be frictionally engaged by the expanded collar 75. When the fastening means or nut 28 is loosened or removed, the support bolt 25 will be free for limited axial movement but will be retained by the protruding collar 75.

Figure 7:
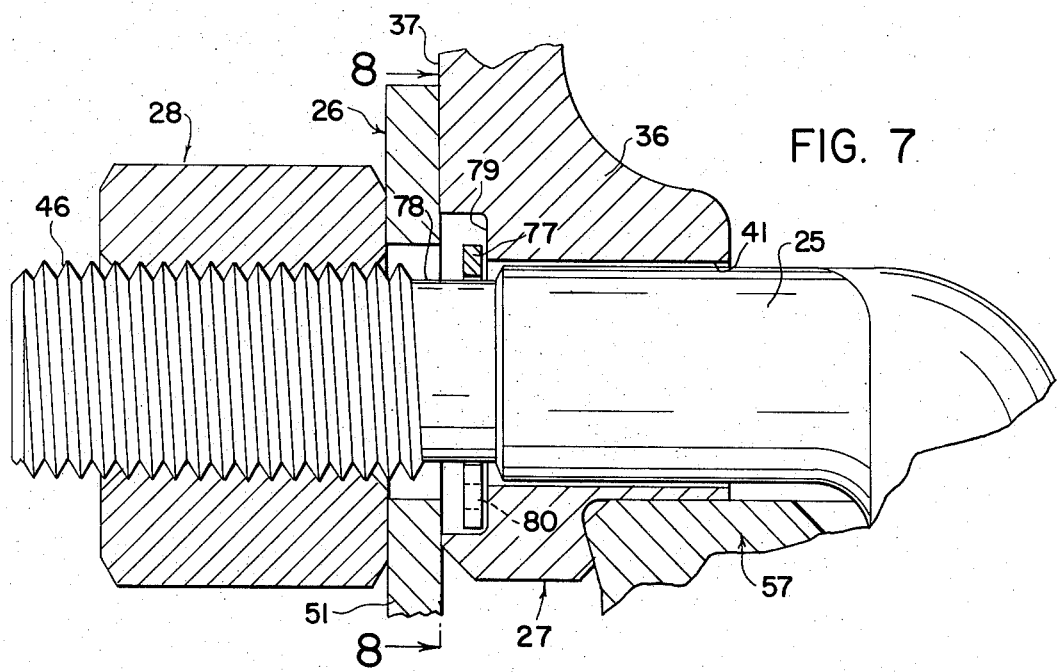
FIg. 7 is a similar view, illustrating a retaining ring carried on the shank of the fastening element and received in a shallow recess or well on the boss surface of the wheel.
Figure 8:
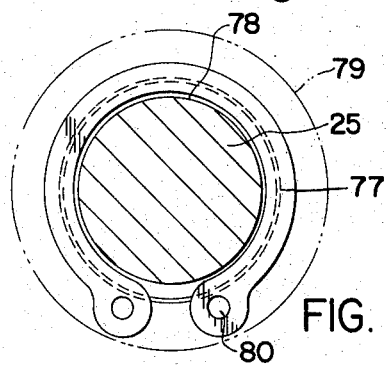
FIG. 8 is a plan view taken substantially as indicated on line 8—8 of FIG. 7.

Referring to FIGS. 7 and 8, the retaining means 29 may be a split ring 77 carried on a reduced diameter portion 78 on the shank of the fastening elements 25 adjacent the threads 46. The protruding ring 77 is movably received within a shallow recess or well 79 on the wheel boss surface 37 concentric with the wheel bore 41. After the bolt 25 is installed, by insertion of the threaded portion 46 into the axially inner end of the wheel bore 41 and pushed through, the ring 77 is snapped into place. If desired, the ring 77 may be secured in place by inserting a wire (not shown) through the small eyelets 80. When the support bolt 25 is in the rim mounting condition, as shown, the ring 77 will be received within the recess 79. When the fastening means or nut 28 is loosened or removed, the support bolt 25 will be free for limited axial movement, but will be retained by the protruding ring 77.

Figure 9:
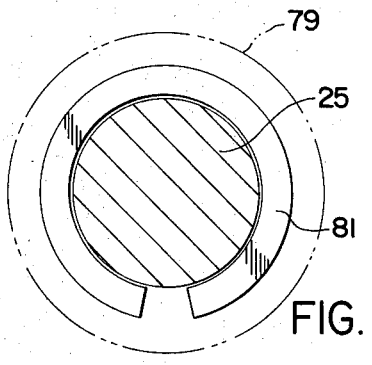
FIG. 9 is a plan view of a spring clip for retaining the fastening element.

Referring to FIG. 9, the retaining means 29 may be a spring clip 81, installed and used in the manner of the ring 77 as described above.

What is claimed is:

1. A rim and wheel assembly 20 comprising, a wheel 23, a series of axially inner clamp means 24, and a series of axially outer clamp lugs 26 to cooperatively engage mounting surfaces on the flange of a rim 21,
   said wheel 23 having a peripheral portion with means 27 for positive retention of said clamp lugs 26, said means 27 being defined by a radially oriented boss surface 37, an intersecting axially oriented surface 38, an intersecting inclined radially inwardly and axially outwardly surface 39 and an intersecting axially oriented concave surface 40,
   each said clamp lug 26 having a radial leg 51 and an axial leg 52, said radial leg having a surface 53 for engagement with said boss surface 37 and said axial leg having a radially inwardly projecting seat portion 57, said seat portion 57 having an inclined surface 59 for engagement with said inclined radially inwardly and axially outwardly surface 39, a convex surface 60 for engagement with said concave surface 40, and intersecting surfaces 62 and 63 for engaging a radially inner surface 32 and an axially outer surface 33 on said rim flange,
   each said clamp means 24 being a one-piece solid element having a support bolt 25 joined to a wedge portion 47 with a radially outer face having a conical surface 48 for engagement with an axially inner surface 31 on said rim flange, each said support bolt 25 extending axially through a bore 41 in said wheel and opening onto a boss surface 37,
   said support bolt 25 of each clamp means 24 carrying a fastening means 28, said clamp means 24 being drawn axially toward said clamp lugs 26 by the tightening of said fastening means 28 on said support bolts,
   said assembly 20 having retaining means 29 so that said support bolts 25 are retained in said wheel bores 41 when said fastening means 28 are loosened or removed.

2. A rim and wheel assembly according to claim 1, wherein said retaining means is an annular rubber collar in said counter-bore.

3. A rim and wheel assembly according to claim 1, wherein said retaining means is a protruding collar received in a counter-bore.

4. A rim and wheel assembly according to claim 3, wherein said protruding collar is a serrated metal collar.

5. A rim and wheel assembly according to claim 1, wherein said retaining means is a protruding collar received in a counter-bore in said wheel.

6. A rim and wheel assembly according to claim 5, wherein said protruding collar is a serrated metal collar formed integrally on the shank of the fastening elements.

7. A rim and wheel assembly according to claim 5, wherein said protruding collar is an annular rubber collar bonded on the shank of the fastening elements.

8. A rim and wheel assembly according to claim 5, wherein said protruding collar is a split ring carried on the shank of the fastening elements and said counter-bore is a shallow recess on the boss surfaces of said wheel and concentric with said wheel bore.

9. A rim and wheel assembly according to claim 5, wherein said protruding collar is a spring clip carried on the shank of the fastening elements and said counter-bore is a shallow recess on the boss surfaces of said wheel and concentric with said wheel bore.

* * * * *